United States Patent [19]
Muroi

[11] Patent Number: 5,357,515
[45] Date of Patent: Oct. 18, 1994

[54] NON-INTERRUPTION TRANSMISSION LINE SWITCHING SYSTEM IN A DUPLEX TRANSMISSION NETWORK

[75] Inventor: Kiyoshi Muroi, Tokyo, Japan
[73] Assignee: NEC Corporation, Japan
[21] Appl. No.: 68,688
[22] Filed: May 27, 1993

[30] Foreign Application Priority Data

May 28, 1992 [JP] Japan .................................. 136892

[51] Int. Cl.$^5$ .......................... H04J 3/06; H04L 5/14
[52] U.S. Cl. ................................ 370/102; 370/105.1; 370/24
[58] Field of Search .................... 370/102, 58.1, 105.1, 370/105.2, 105.3, 105.4, 106, 85.1, 24, 32, 31, 112, 85.9, 94.1, 60.1, 110.1, 100.1; 375/107, 114, 116, 118, 120

[56] References Cited

U.S. PATENT DOCUMENTS

5,241,543  8/1993  Amada et al. ......................... 370/102
5,265,090  11/1993  Guinand et al. ..................... 370/102

Primary Examiner—Douglas W. Olms
Assistant Examiner—Dang Ton
Attorney, Agent, or Firm—Ostrolenk, Faber, Gerb & Soffen

[57] ABSTRACT

In a duplex transmission network comprising first and second transmission lines, first and second pointer renewing units process first and second transmission line frame signals from the first and second transmission lines into first and second device frame signals. Each transmission line frame signal comprises a virtual container (VC) and an original pointer designating a location of the VC in a transmission line frame. Each device frame signal comprises the VC and a renewed pointer designating another location of the VC in a device frame. In each pointer renewing unit, a pointer comparator (109) compares the renewed pointers of the first and second device frame signals with each other and produces a subsidiary stuff control signal (215). A selector (108) selects one of a primary stuff request signal (211) and the subsidiary stuff control signal as a selected stuff control signal used in a read controller (107). A write controller (105) controls writing of the VC of the transmission line signal in a buffer memory in response to a selection signal (216) by supplying a write address signal to the memory. The read controller controls reading of the VC from the memory in response to the selected stuff control signal by supplying a read address signal to the memory.

3 Claims, 10 Drawing Sheets

NON-INTERRUPTION TRANSMISSION LINE SWITCHING SYSTEM IN A DUPLEX TRANSMISSION NETWORK

BACKGROUND OF THE INVENTION

This invention relates to a transmission line switching system for use in a duplex transmission network comprising a duplex transmission line.

A duplex transmission network of the type described comprises first and second transmission lines as the duplex transmission line and first and second transmitting devices connected to the first and the second transmission lines, respectively. Each of the first and second transmitting devices receives a virtual container signal (VC) which contains digital data as known in the art. The first and second transmitting devices transmit, to the first and second transmission lines, first and second transmission line frame signals, respectively, each of which comprises an original pointer and the virtual container in each transmission line frame. The original pointer designates the location of a leading edge of the virtual container in each transmission line frame.

Each of the first and the second transmission line frame signals is typically a synchronous transfer mode (STM) signal comprising a section overhead (SOH) which precedes the virtual container. The original pointer is included in the section overhead.

The duplex transmission network further comprises first and second receiving devices comprising first and second pointer renewing units connected to the first and second transmission line, respectively. The first and second pointer renewing units receive the first and second transmission line frame signals from the first and second transmission lines as first and second incoming frame signals, respectively. Between the first and second incoming frame signals, a phase difference is inevitably present due to a difference in length between the first and second transmission lines. The first and second pointer renewing units produce first and second device frame signals, respectively, each of which comprises a renewed pointer and the virtual container in each device frame. The renewed pointer designates the renewed location of the leading edge of the virtual container in each device frame. The device frame of the second device frame signal is synchronized with the device frame of the first device frame signal. In other words, a phase difference is not present between the device frame of the first device frame signal and the device frame of the second device frame signal.

Connected to the first and second pointer renewing units, a selecting unit selects one of the first and second device frame signals as a selected device frame signal in response to a selection signal to make a subsequent unit extract the virtual container from the selected device frame signal on the basis of the renewed pointer of each device frame. The subsequent unit is typically a synchronous digital hierarchy (SDH) terminator known in the art.

As will later be described, a conventional transmission line switching system comprises, in each of the first and second pointer renewing units, an elastic buffer memory, a write controller for controlling writing of the virtual container into the buffer memory, a read controller for controlling reading of the virtual container from the buffer memory, and a phase comparing circuit for comparing a reading phase of the read controller with a writing phase of the write controller to produce a primary stuff request signal and deliver the primary stuff request signal to the read controller. The conventional transmission line switching system is incapable of switching without interruption between the first and the second device frame signals. This is because the leading edge of the virtual container of each device frame of the second device frame signal is not in synchronism with the leading edge of the virtual container of each device frame of the first device frame signal. That is, a phase difference is present between the virtual containers of the first and second device frame signals.

SUMMARY OF THE INVENTION

It is therefore an object of this invention to provide a transmission line switching system which is capable of switching without interruption between first and second device frame signals.

It is another object of this invention to provide a transmission line switching system of the type described, which makes it possible to synchronize the leading edge of a virtual container of each device frame of the second device frame signal with the leading edge of a virtual container of each device frame of the first device frame signal.

Other objects of this invention will become clear as the description proceeds.

The transmission line switching system according to the invention is for use in a duplex transmission network comprising: a first and a second transmission line; a first and a second transmitting device connected to the first and the second transmission lines, respectively, and supplied with a common virtual container signal having a virtual container, the first and second transmitting devices transmitting to the first and the second transmission lines a first and a second transmission line frame signal, respectively, each of which comprises a transmission line frame comprising an original pointer and the virtual container, the original pointer designating a location of a leading edge of the virtual container in the transmission line frame; a first and a second pointer renewing unit connected to the first and the second transmission lines, respectively, for processing the first and the second transmission line frame signals into a first and a second device frame signal, respectively, each of which comprises a device frame comprising a renewed pointer and the virtual container, the renewed pointer designating a renewed location of the leading edge of the virtual container in the device frame, the device frame of the first and the second device frame signals being synchronized with each other; and a selecting unit connected to the first and the second pointer renewing units for selecting one of the first and the second device frame signals as a selected device frame signal.

The transmission line switching system includes in the first pointer renewing unit: a first buffer memory connected to the first transmission line; a first interpreter connected to the first transmission line for interpreting the original pointer of the first transmission line signal as a first interpreted original pointer to produce a first interpreted signal representative of the first interpreted original pointer; a first write controller connected to the first interpreter for controlling writing of the virtual container of the first transmission line signal in the first buffer memory in response to the first interpreted signal by supplying a first write address signal to the first buffer memory; a first read controller for controlling reading of the virtual container out of the first buffer memory in response to a first controller stuff request signal by supplying a first read address signal to the first buffer memory; a first comparing circuit for comparing the first read address signal with the first write address signal to produce a first primary stuff request signal; a first renewed pointer producer connected to the first buffer memory and the first interpreter for producing the renewed pointer of the first device frame signal in response to the first interpreted signal by monitoring the first buffer memory; and a first frame producer connected to the first buffer memory and the first renewed pointer producer for producing the first device frame signal.

The transmission line switching system includes in the second pointer renewing unit: a second buffer memory connected to the second transmission line; a second interpreter connected to the second transmission line for interpreting the original pointer of the second transmission line signal as a second interpreted original pointer to produce a second interpreted signal representative of the second interpreted original pointer; a second write controller connected to the second interpreter for controlling writing of the virtual container of the second transmission line signal in the second buffer memory in response to the second interpreted signal by supplying a second write address signal to the second buffer memory; a second read controller for controlling reading of the virtual container out of the second buffer memory in response to a second controller stuff request signal by supplying a second read address signal to the second buffer memory; a second comparing circuit for comparing the second read address signal with the second write address signal to produce a second primary stuff request signal; a second renewed pointer producer connected to the second buffer memory and the second interpreter for producing the renewed pointer of the second device frame signal in response to the second interpreted signal by monitoring the second buffer memory; and a second frame producer connected to the second buffer memory and the second renewed pointer producer for producing the second device frame signal.

According to this invention, the transmission line switching system comprises in the first pointer renewing unit: a first pointer comparator connected to the first and the second renewed pointer producers for comparing the renewed pointer of the first device frame signal with the renewed pointer of the second device frame signal to produce a first subsidiary stuff request signal; and a first selector connected to the first pointer comparator for selecting one of the first primary stuff request signal and the first subsidiary stuff request signal as a first selected stuff request signal which is for use as the first controller stuff request signal.

DESCRIPTION OF THE PREFERRED EMBODIMENT

Figure 1:
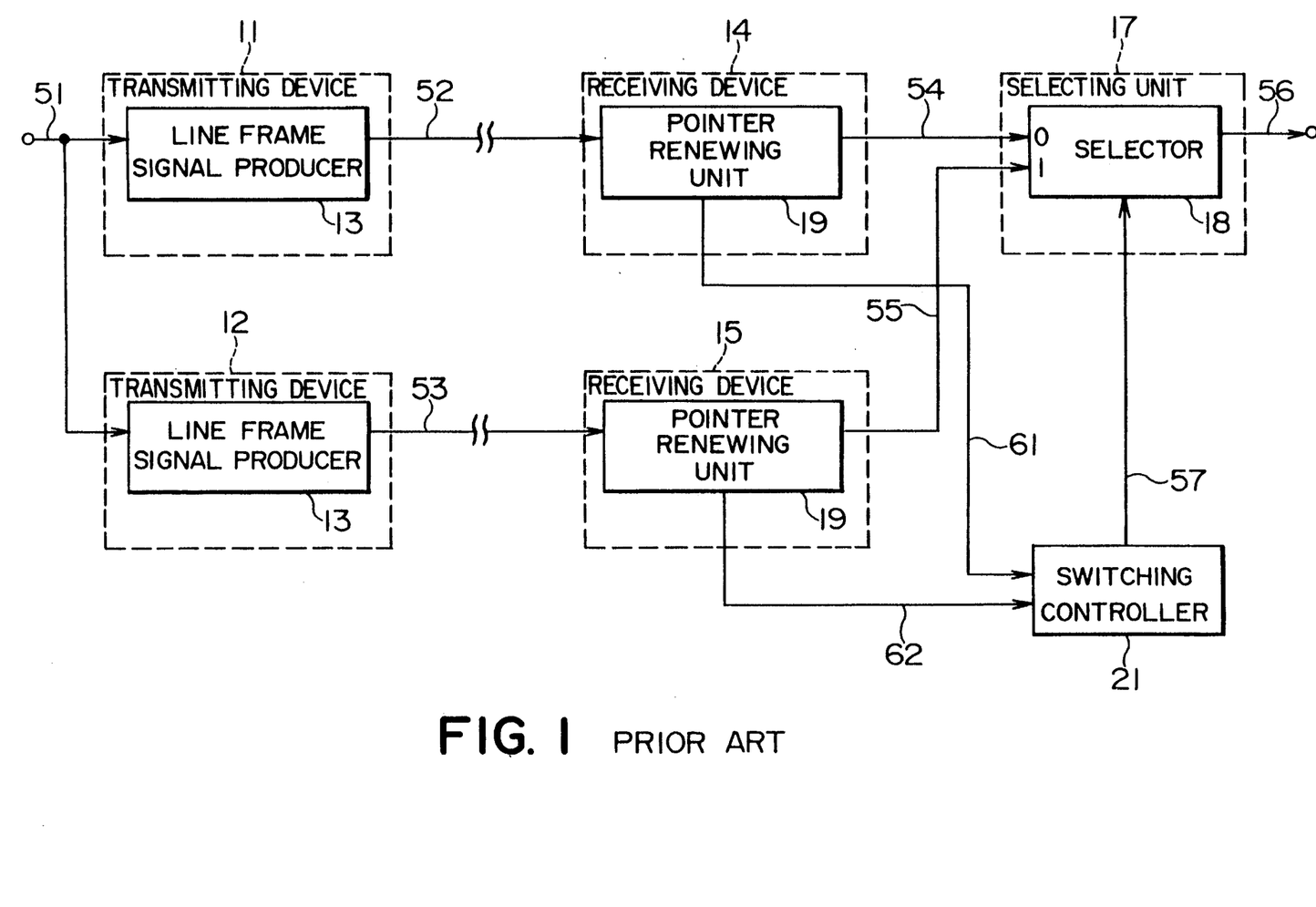
FIG. 1 is a block diagram of a duplex transmission network comprising a conventional transmission line switching system.

Referring to FIG. 1, a duplex transmission network comprising a conventional transmission line switching system will first be described for a better understanding of this invention. The duplex transmission network is equivalent to the duplex transmission network described in the preamble of the instant specification.

The duplex transmission network comprises first and second transmission lines 52 and 53 and first and second transmitting devices 11 and 12 connected to the first and the second transmission line 52 and 53, respectively. Each of the first and second transmitting devices 11 and 12 comprises a line frame signal producer 13. The line frame signal producer 13 of each of the first and second transmitting devices 11 and 12 receives a virtual container (VC) signal 51 comprising a virtual container which contains digital data. The line frame signal producers 13 of the first and second transmitting devices 11 and 12 transmit first and second transmission line frame signals to the first and the second transmission lines 52 and 53, respectively.

Figure 2:
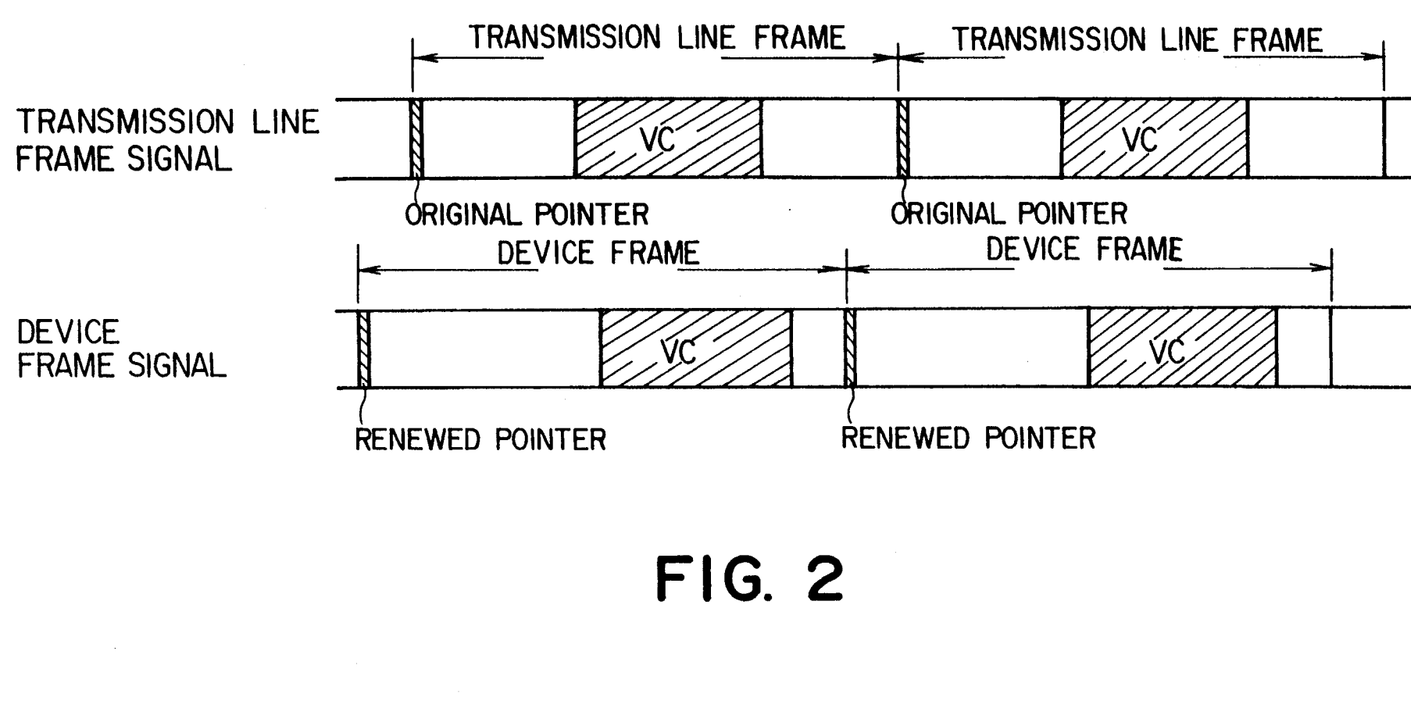
FIG. 2 is a timing chart for use in describing the structure of an incoming frame signal and a device frame signal.

Turning to FIG. 2, the transmission line frame signal is depicted along the first or top row. Each of the first and the second transmission line frame signals comprises an original pointer and the virtual container VC in each transmission line frame. The original pointer designates the location of the leading edge of the virtual container VC in each transmission line frame. The transmission line frame signal is typically a synchronous transfer mode (STM) signal comprising a section overhead (SOH) preceding the virtual container. The original pointer is included in the section overhead.

Turning back to FIG. 1, each of the first and second receiving devices 14 and 15 comprises a pointer renewing unit 19. The pointer renewing units 19 of the first and second receiving devices 14 and 15 are connected to the first and second transmission lines 52 and 53, respectively, to receive the first and second transmission line frame signals from the first and second transmission lines 52 and 53 as first and second incoming frame signals, respectively.

Figure 3:
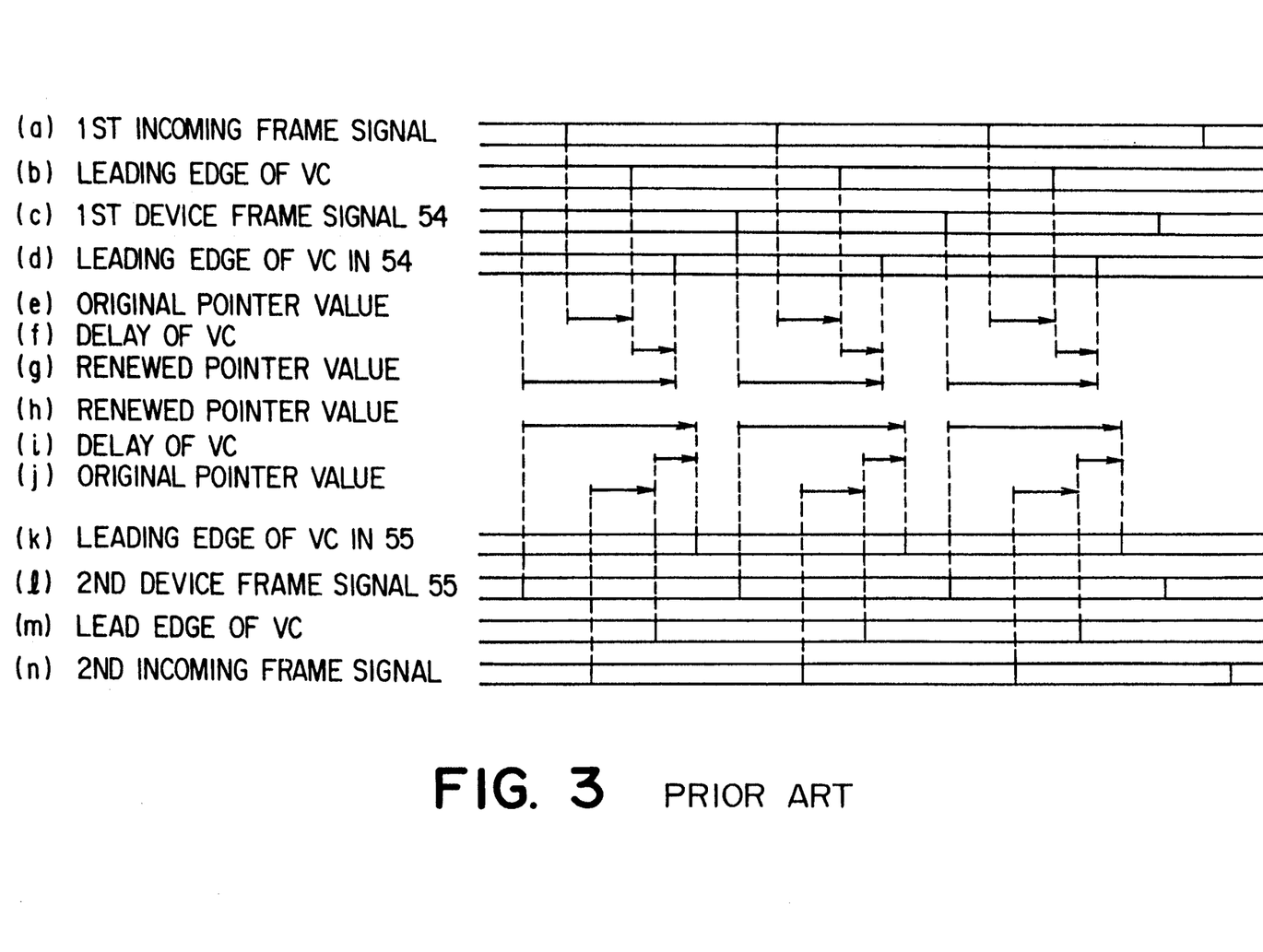
FIG. 3 is a timing chart for use in describing the operation of the duplex transmission network illustrated in FIG. 1.

Turning to FIG. 3, the transmission line frame of the fist incoming frame signal is depicted along the first row (a) from the top. The leading edge of the virtual container VC in the first incoming frame signal is depicted along the second row (b) from the top. The transmission line frame of the second incoming frame signal is depicted along row (n), first row from the bottom. The leading edge of the virtual container VC in the second incoming frame signal is depicted along the second row (m) from the bottom. Between the first and the second incoming frame signals (a) and (n), a phase difference is inevitably present due to a difference in length between the first and the second transmission lines 52 and 53 (FIG. 1).

Turning to FIG. 3, the transmission line frame of the first incoming frame signal is depicted along the first row (a) from the top. The leading edge of the virtual container VC in the first incoming frame signal is depicted along the second row (b) from the top. The transmission line frame of the second incoming frame signal is depicted along row (n), first row from the bottom. The leading edge of the virtual container VC in the second incoming frame signal is depicted along the second row (m) from the bottom. Between the first and the second incoming frame signals (a) and (n), a phase difference is inevitably present due to a difference in length between the first and the second transmission lines 52 and 53 (FIG. 1).

In FIG. 1, the pointer renewing units 19 of the first and second receiving devices 14 and 15 produce first and second device frame signals 54 and 55, respectively.

Turning to FIG. 2 again, the device frame signal is depicted along the second or bottom row. Each of the first and second device frame signals 54 and 55 comprises a renewed pointer and the virtual container VC in each device frame. The renewed pointer designates a renewed location of the leading edge of the virtual container VC in each device frame.

Turning to FIG. 3 again, the device frame of the first device frame signal 54 (FIG. 1) is depicted along the third row (c) from the top. The leading edge of the virtual container VC in the first device frame signal 54 is depicted along the fourth row (d) from the top. An original pointer value of the original pointer of the first incoming line frame signal is illustrated along the fifth row (e) from the top. The delay of the virtual container VC in the pointer renewing unit 19 of the first receiving device 14 in FIG. 1 is illustrated along the sixth row (f) from the top and will later be described. A renewed pointer value of the renewed pointer of the first device frame signal is depicted along the seventh row (g) from the top.

The device frame of the second device frame signal 55 (FIG. 1) is depicted along the third row (l) from the bottom. The device frame of the second device frame signal 55 is synchronized with the device frame of the first device frame signal 54. That is, a phase difference is not present between the device frame of the first device frame signal 54 and the device frame of the second device frame signal 55. The leading edge of the virtual container VC in the second device frame signal 55 is depicted along the fourth row (k) from the bottom. An original pointer value of the original pointer of the second incoming line frame signal is illustrated along the fifth row (j) from the bottom. The delay of the virtual container VC in the pointer renewing unit 19 of the second receiving device 15 in FIG. 1 is illustrated along the sixth row (i) from the bottom. As will later be described, the delay of the virtual container VC in the pointer renewing unit 19 of the second receiving device 15 becomes equal to the delay of the virtual container VC in the pointer renewing unit 19 of the first receiving device 15. A renewed pointer value of the renewed pointer of the second device frame signal 55 is depicted along a seventh row (h) from the bottom.

Connected to the pointer renewing units of the first and the second receiving devices 14 and 15, a selector 18 of a selecting unit 17 selects one of the first and second device frame signals 54 and 55 as a selected device frame signal 56 in response to a selection signal 57 to make a subsequent unit (not shown) extract the virtual container from the selected device frame signal on the basis of the renewed pointer of each device frame as mentioned above.

The pointer renewing units 19 of the first and the second receiving devices 14 and 15 furthermore monitor the first and the second incoming frame signals and produce first and second switching request signals 61 and 62 when degradation of quality is detected in the first and second incoming frame signals, respectively. In this event, monitoring is carried out as regards either the synchronization state of each of the first and the second incoming frame signals or the number of bit errors due to parity check of the first and second incoming frame signals.

Connected to the pointer renewing units 19 of the first and second receiving devices 14 and 15, a switching controller 21 processes the first and second switching request signals 61 and 62 into the selection signal 57 indicating which one of the first and second device frame signals 54 and 54 has a higher quality. In this embodiment, the switching controller 21 produces a selection signal 57 of a logic "0" level to indicate the first device frame signal 54 when the first incoming frame signal has a quality higher than that of the second incoming frame signal. On the other hand, the switching controller 21 produces a selection signal 57 of a logic "1" level to indicate the second device frame signal 55 when the second incoming frame signal has a quality higher than that of the first incoming frame signal.

In FIGS. 1 and 3, the description will proceed to the reason why the pointer renewing units 19 of the first and second receiving devices 14 and 15 process the first and second incoming frame signals into the first and second device frame signals 54 and 55, respectively. Inasmuch as the delays of the first and second transmission lines 52 and 53 are indefinite, the phases of the first and second incoming frame signals are indefinite. In order to make the selecting unit 17 carry out a switching operation, it is necessary to switch the virtual container from the first and second incoming frame signals to the first and second device frame signals 54 and 55, respectively, the device frames of which are synchronized with each other.

Such switching of the virtual container from the incoming frame signal to the device frame signal can be carried out by changing the original pointer to the renewed pointer on the basis of CCITT (The International Telegraph and Telephone Consultative Committee) Recommendation G709. This invention is based on this method.

Figure 4:
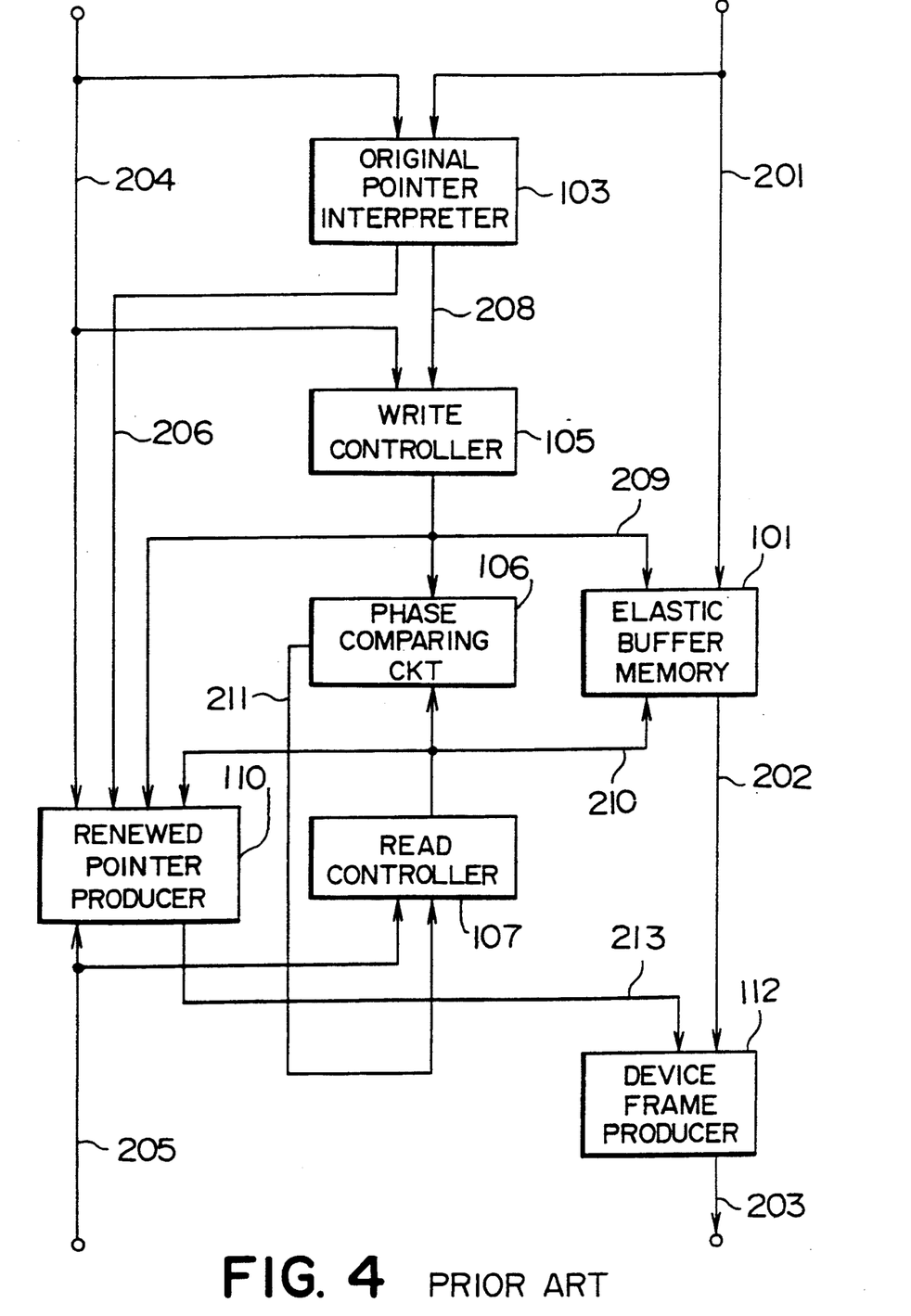
FIG. 4 is a block diagram of a pointer renewing unit used in the duplex transmission network illustrated in FIG. 1.

Turning to FIG. 4, each of the pointer renewing units 19 of the first and second receiving devices 14 and 15 of FIG. 1 comprises an elastic buffer memory 101 supplied with the incoming frame signal 201 which is either of the first or the second incoming frame signals. An original pointer interpreter 103 receives the incoming frame signal 201. Responsive to a transmission line frame timing signal 204 extracted from the incoming frame signal at a transmission line frame period, the original pointer interpreter 103 interprets the original pointer of the incoming frame signal and determines the original pointer value, the leading edge of the virtual container, and the positive/negative stuff to produce a transmission line pointer signal 206 representative of the original pointer value and a stuff judgment signal 208 representative of either negative or positive stuff. Thus, the original pointer interpreter 103 serves as an interpreter for interpreting the original pointer of the transmission line signal as an interpreted original pointer to produce an interpreted signal (206 and 208) representative of the interpreted original pointer.

Responsive to the transmission line frame timing signal 204 and the stuff judgment signal 208, a write controller 105 supplies the elastic buffer memory 101 with a write address signal 209 so that only the virtual container of the incoming frame signal 201 is written in the elastic buffer memory 101. By supplying the elastic buffer memory 101 with a read address signal 210, the virtual container is read out of the elastic buffer memory 101 as a virtual container signal 202.

A phase comparing circuit 106 compares the value of a read address signal 210 with a value of the write address signal 209 and produces a primary stuff request signal 211 so that the write phase and the read phase are optimized. A read controller 107 is supplied with the primary stuff request signal 211 as a controller stuff request signal and with the device frame timing signal 205 which defines the device frame of the device frame signal 203. Responsive to the device frame timing signal 205 and the primary stuff request signal 211, the read controller 107 supplies the elastic buffer memory 101 with a read address signal 210 so that the virtual container is read out of the elastic buffer memory 101 as the virtual container signal 202.

A renewed pointer producer 110 responds to the transmission line frame timing signal 204, the device frame timing signal 205, the write address signal 209, the read address signal 210, and the transmission line pointer signal 206. The renewed pointer producer 110 calculated a renewed pointer value and produces a renewed pointer signal 213 representative of the renewed pointer value. Briefly stating, the renewed pointer producer 110 produces the renewed pointer of the device frame signal in response to the interpreted signal (206 and 208) by monitoring the buffer memory 101. A device frame producer 112 adds the renewed pointer signal 213 to the virtual container signal 202 and produces a device frame signal 203 which is either of the first or second device frame signals 54 and 55 of FIG. 1 and is illustrated in FIG. 2 along the bottom row.

In FIG. 4, a delay is required from the write timing of the virtual container in the elastic buffer memory 101 to the read timing of the virtual container out of the elastic buffer memory 101. The delay is illustrated in FIG. 3 along row (f) or (i). The pointer renewing unit controls the delay on the basis of a center value corresponding to half of the memory capacity of the elastic buffer memory 101. For this purpose, the comparing circuit 106 detects the delay as a phase difference between the write address signal 209 and the read address signal 210 and produces, when the phase difference shifts by a constant value from the center value, the primary stuff request signal 211 so as to compensate for the phase difference.

When the phase difference is less than the constant value, the phase comparing circuit 106 produces the primary stuff request signal 211 representative of a positive stuff request. Responsive to the primary stuff request signal 211 representative of the positive stuff request, the read controller 107 interrupts the reading operation once. As a result, the phase of the virtual container signal 202 becomes late and the phase difference increases by one. This is detected by the renewed pointer producer 110. The pointer value produced by the renewed pointer producer 110 becomes larger by one. This means that the phase of the virtual container signal 202 is delayed.

When the phase difference is greater than the constant value, the phase comparing circuit 106 produces the primary stuff request signal 211 representative of a negative stuff request. In response to the negative stuff request, the read container 107 carries out an inverse control so that the phase difference decreases by one. The pointer value produced by the renewed pointer producer 110 becomes smaller by one.

Thus, control is made so that the delay of the virtual controller VC becomes equal to a constant value as illustrated in FIG. 3. As a consequence, the leading edge of the virtual container VC in the second device frame signal 55 (FIG. 1) is not in synchronism with the leading edge of the virtual container VC in the first device frame signal 54 (FIG. 1) as illustrated in FIG. 3. Therefore, it is impossible to perform uninterrupted switching between the first and the second device frame signals 54 and 55 as described above.

Figure 5:
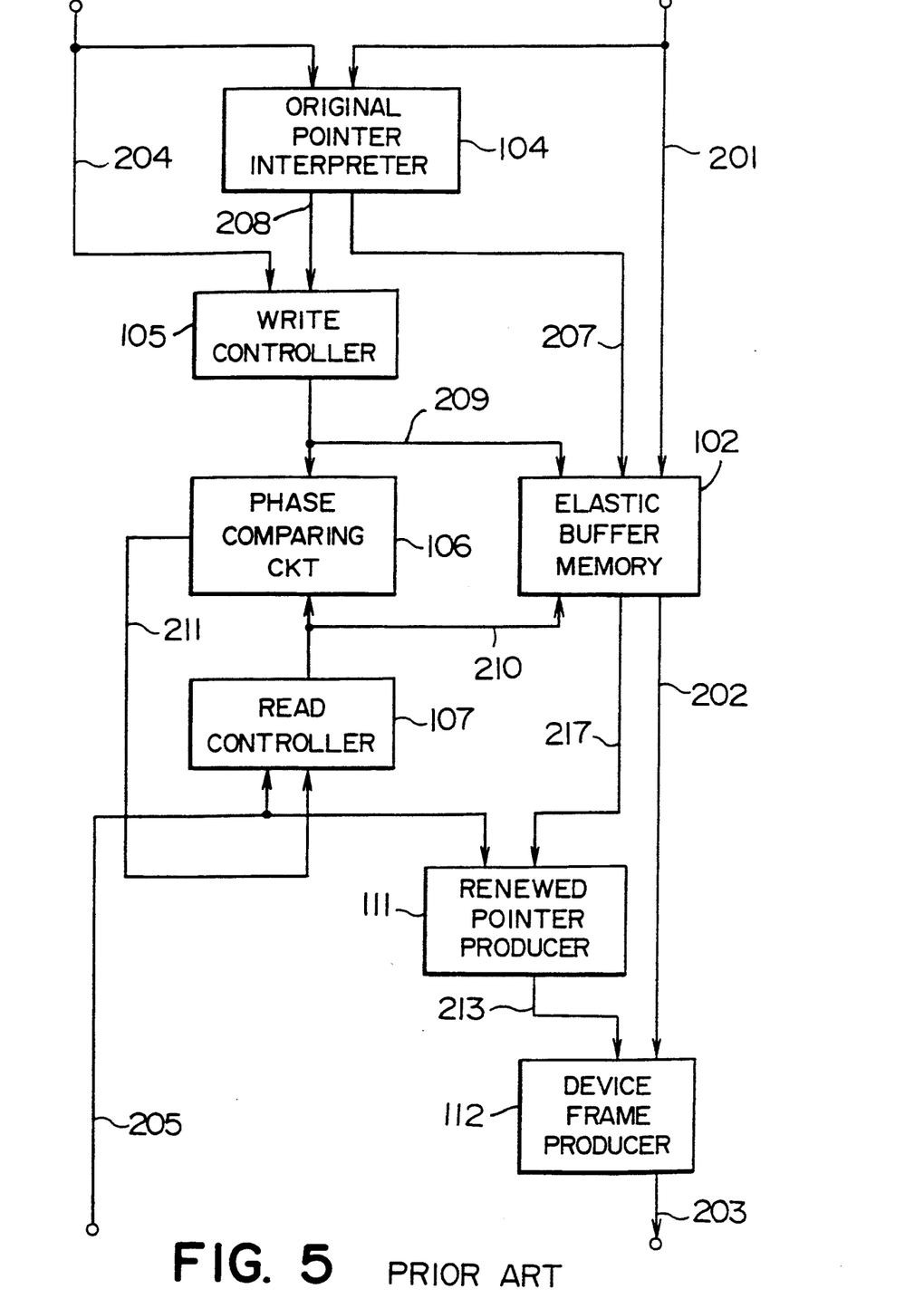
FIG. 5 is a block diagram of a another pointer renewing unit used in the duplex transmission network illustrated in FIG. 1.

Turning to FIG. 5, another pointer renewing unit similar to the pointer renewing unit of FIG. 4 is shown except that the method of producing the renewed pointer signal 213 representative of the renewed pointer value is different. An original pointer interpreter 104 produces a virtual container timing signal 207 indicative of the timing of the leading edge of the virtual container instead of the transmission line pointer signal 206 produced by the original pointer interpreter 104 of FIG. 4. The virtual container timing signal 207 is written into another elastic buffer memory 102 together with the virtual container of the incoming frame signal 201. Responsive to the device frame timing signal 205 and the virtual container timing signal 217 read out of the elastic buffer memory 102, another renewed pointer producer 111 calculates the renewed pointer value and produces the renewed pointer signal 213 representative of the renewed pointer value.

Briefly stating, the original pointer interpreter 104 serves as an interpreter for interpreting the original pointer of the transmission line signal as an interpreted original pointer to produce an interpreted signal (207 and 208) representative of the interpreted original pointer. The renewed pointer producer 111 produces the renewed pointer of the device frame signal in response to the interpreted signal (207 and 208) by monitoring the buffer memory 102.

Figure 6:
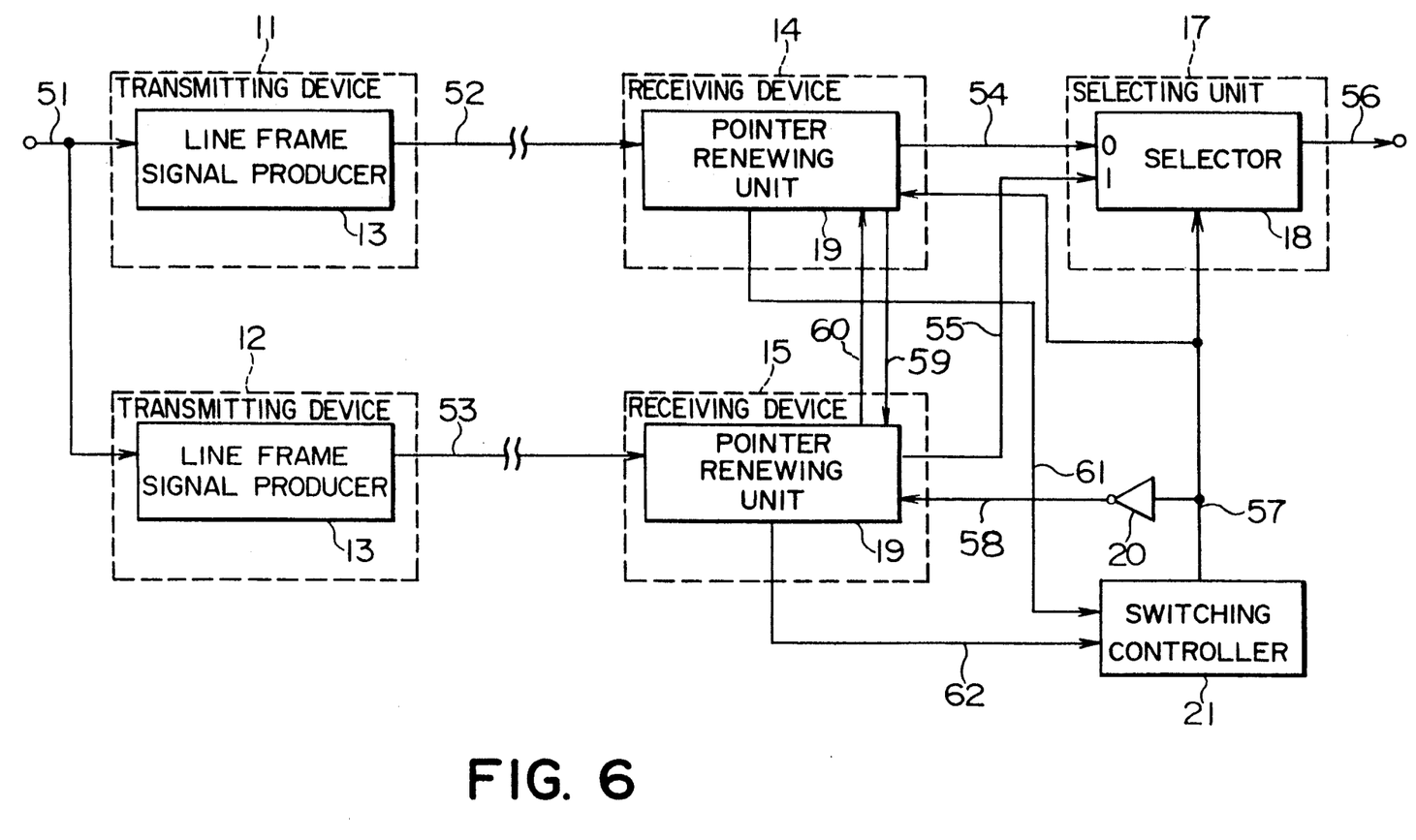
FIG. 6 is a block diagram of a duplex transmission network comprising a transmission line switching system according to an embodiment of this invention.

Turning to FIG. 6, description will proceed to a duplex transmission network comprising a transmission line switching system according to an embodiment of this invention. The duplex transmission network is similar to the duplex transmission network of FIG. 1 except for the following. The pointer renewing unit 19 of the first receiving device 14 is supplied with the selection signal 57 from the switching controller 21 and supplies a first renewed pointer signal 59 representative of a first renewed pointer value to the pointer renewing unit 19 of the second receiving device 15. An inverter 20 inverts the selection signal 57 into an inverted selection signal 58 and supplies a second renewed pointer signal 60 representative of a second renewed pointer value to the pointer renewing unit 19 of the first receiving device 14.

Figure 7:
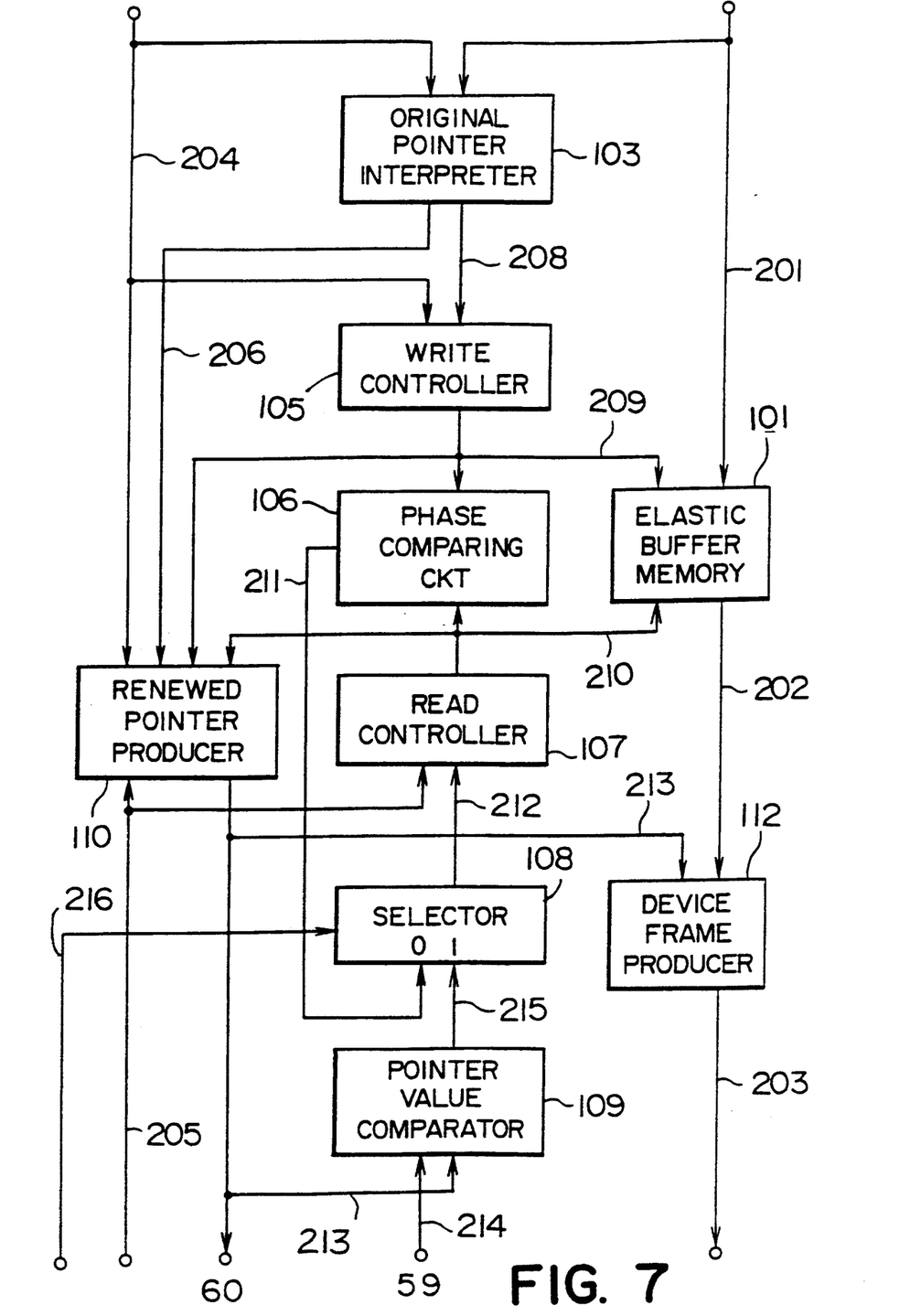
FIG. 7 is a block diagram of a pointer renewing unit used in the duplex transmission network illustrated in FIG. 6.

Turning to FIG. 7, the pointer renewing unit therein is similar to the pointer renewing unit of FIG. 4 except that the pointer renewing unit of FIG. 7 further comprises a pointer value comparator 109 for producing a subsidiary stuff request signal 215 and a selector 108. The selector 108 selects one of the primary and the subsidiary stuff request signals 211 and 215 as a selected stuff request signal 212 in response to a selection signal 216 which is either of the selection signal 57 or the inverted selection signal 58. The selector 108 selects the primary stuff request signal 211 as the selected stuff request signal 212 in response to the selection signal 216 of a logic "0" level. The selector 108 selects the subsidiary stuff request signal 215 as the selected stuff request signal 212. The selected stuff request signal 212 is supplied to the read controller 107 as the controller stuff request signal.

Merely for the brevity of description, it will be assumed that the illustrated pointer renewing unit is the pointer renewing unit 19 of the second receiving device 15 of FIG. 6.

The illustrated renewed pointer producer 110 supplies the renewed pointer signal 213 to the first receiving device 14 as the second renewed pointer signal 60 (FIG. 6) and to the illustrated pointer value comparator 109 which is further supplied with the first receiving device 14 as a renewed pointer signal 214. The pointer value comparator 109 compares the renewed pointer signals 213 and 214 with each other and produces the subsidiary stuff request signal 215.

It will also be assumed that the selector 108 selects the subsidiary stuff request signal 215 as the selected signal 212 and that the read controller 107 carries out operation in response to the subsidiary stuff request signal 215. The pointer value comparator 109 produces the subsidiary stuff request signal 215 representative of a positive stuff request when the renewed pointer value of the second renewed pointer signal 213 is less than the renewed pointer value of the first renewed pointer signal 214. Responsive to the subsidiary stuff request signal 215 representative of a positive stuff request, the read controller 107 interrupts a reading operation once. As a result, the phase of the virtual container signal 202 becomes late and the phase difference increases by one. This is detected by the renewed pointer producer 110. The pointer value produced by the renewed pointer producer 110 becomes larger by one.

When the renewed pointer value of the second renewed pointer signal 213 is greater than the renewed value of the first renewed pointer signal 214, the pointer value comparator 109 produces the subsidiary stuff request signal 215 representative of a negative stuff request. In response to the negative stuff request, the read controller 107 carries out an inverse control so that the phase difference decreases by one. The pointer value produced by the renewed pointer producer 110 becomes smaller by one.

Such operation is carried out until the pointer value of the second renewed pointer signal 213 becomes equal to the pointer value of the first renewed pointer signal 214.

Figure 8:
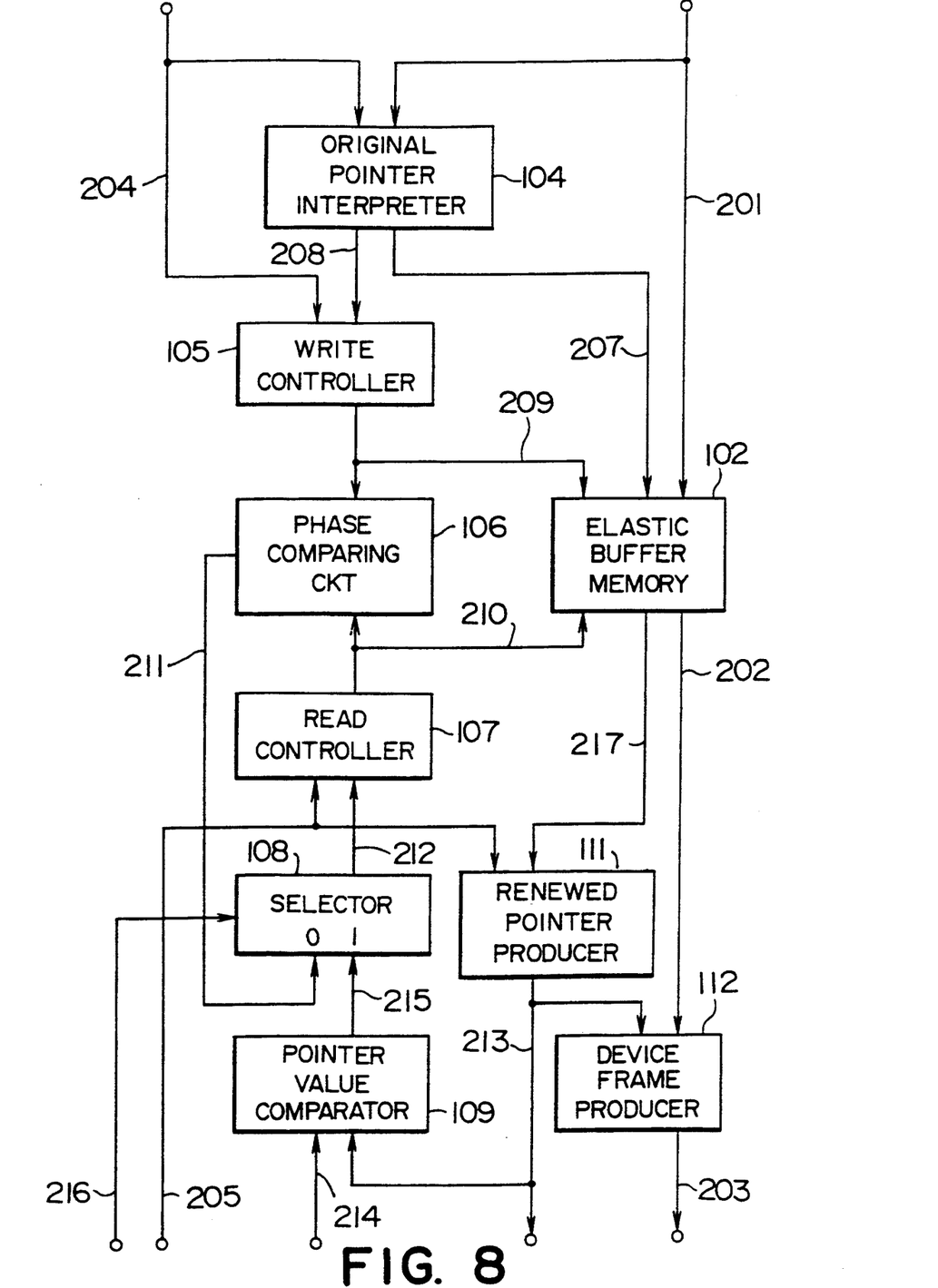
FIG. 8 is a block diagram of another pointer renewing unit used in the duplex transmission network illustrated in FIG. 6.

Turning to FIG. 8, another pointer unit is shown similar to the pointer renewing unit of FIG. 5 except that the pointer renewing unit of FIG. 8 further comprises a different pointer value comparator 109 and selector 108. The pointer comparator 109 and the selector 108 operate in a manner similar to those of FIG. 7.

Figure 9:
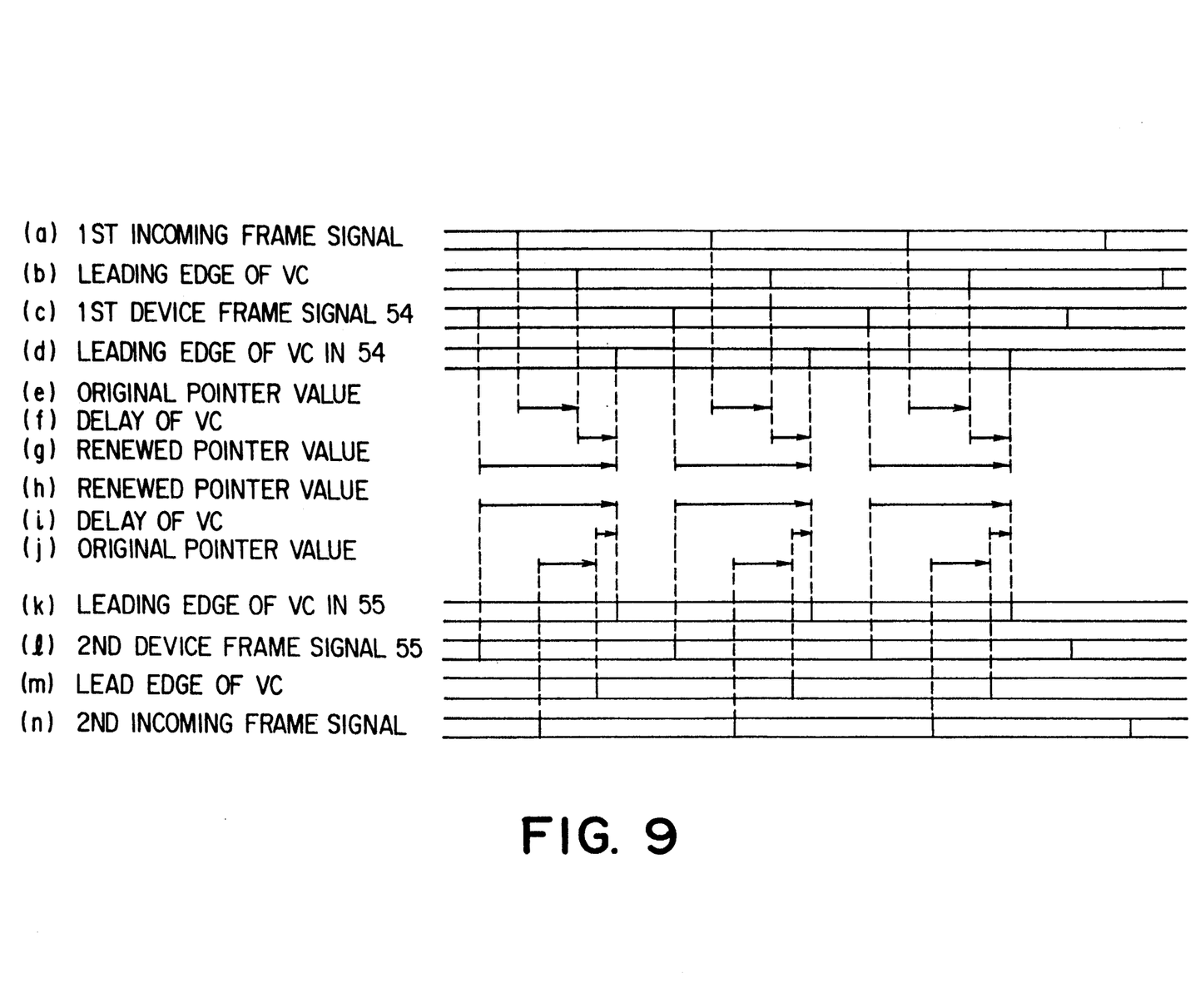
FIG. 9 is a time chart for use in describing the operation of the duplex transmission network of FIG. 6 when a selecting unit selects a first device frame signal.

When the selector 108 (FIG. 6) selects the first device frame signal 54, the duplex transmission network of FIG. 6 operates in the manner illustrated in FIG. 9. In this case, the switching controller 21 produces a selection signal 57 of a logic "0" level. The selector 108 (FIG. 7 or 8) of the pointer renewing unit 19 of the first receiving device 14 thereby selects the primary stuff request signal 211 (FIG. 7 or 8). On the other hand, the selector 108 of the pointer renewing unit 19 of the second receiving device 15 selects the subsidiary stuff request signal 215 (FIG. 7 or 8). In FIG. 9, the renewed pointer value of row (h) becomes equal to the renewed pointer value of row (g) in accordance with this invention. In other words, the leading edge of the virtual container VC of the second device frame signal 55 of row (k) is synchronized with the leading edge of the virtual container VC of the first device frame signal 54 of row (d).

Figure 10:
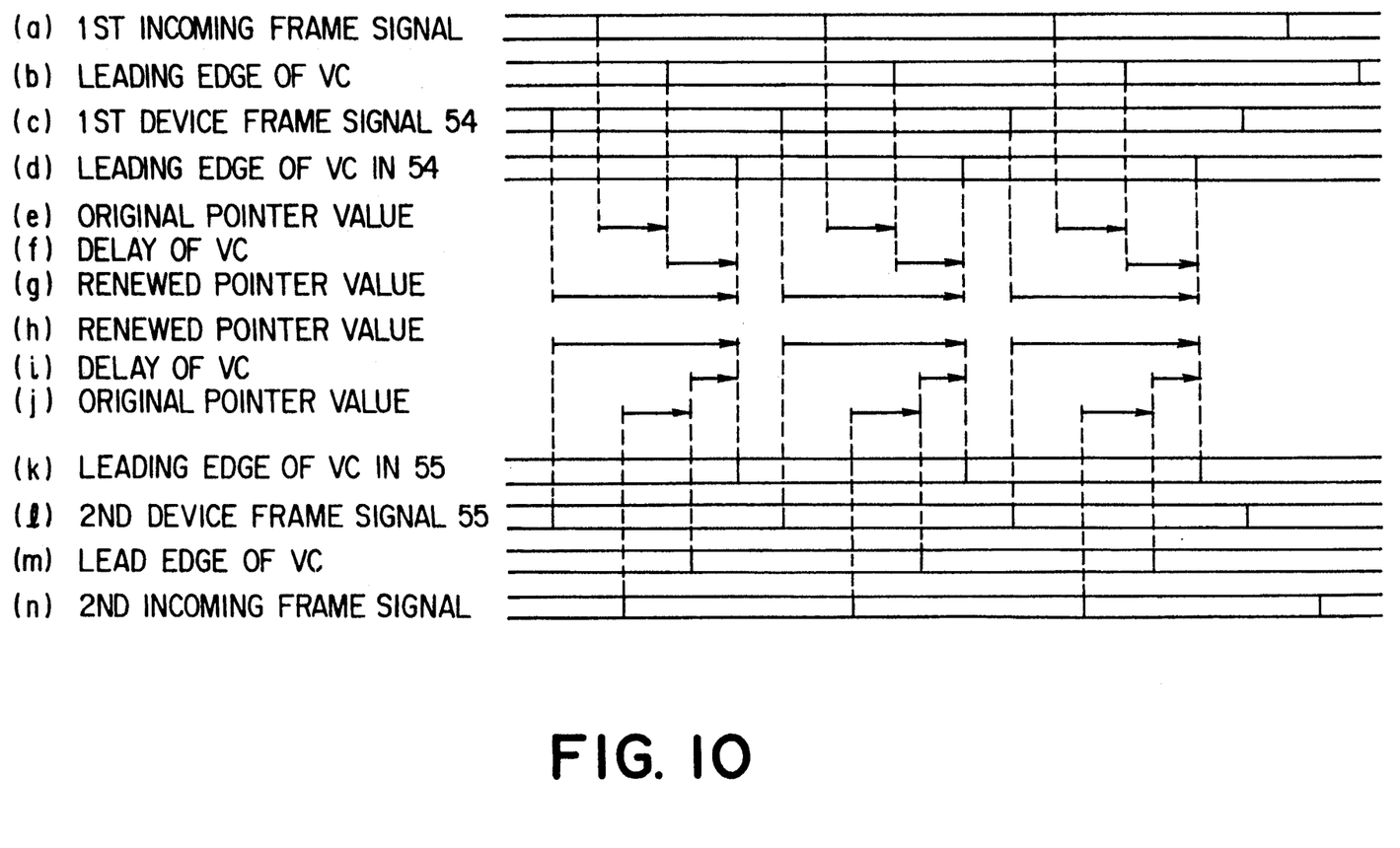
FIG. 10 is a timing chart for use in describing the operation of the duplex transmission network of FIG. 6 when a selecting unit selects a second device frame signal.

When the selector 18 selects the second device frame signal 55 in response to the selection signal 57 of a logic "1" level, the duplex transmission network of FIG. 6 operates in the manner illustrated in FIG. 10. In this case, the selector 108 (FIG. 7 or 8) at the pointer renewing unit 19 of the first receiving device 14 selects the subsidiary stuff request signal 215 (FIG. 7 or 8). In FIG. 10, the renewed pointer value of row (g) becomes equal to the renewed pointer value of row (h). The leading edge of the virtual container VC of the first device frame signal 54 of row (d) is synchronized with the leading edge of the virtual container VC of the second device frame signal 55 of row (k).

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A transmission line switching system for use in a duplex transmission network comprising:

a first and a second transmission line;

a first and a second transmitting device connected to said first and said second transmission lines, respectively, and supplied with a common virtual container signal having a virtual container, the first and second transmitting devices transmitting to said first and said second transmission lines a first and a second transmission line frame signal respectively, each of which comprises a transmission line frame comprising an original pointer and said virtual container, said original pointer designating a location of a leading edge of said virtual container in said transmission line frame;

a first and a second pointer renewing unit connected to said first and said second transmission lines, respectively, for processing said first and said second transmission line frame signals into a first and a second device frame signal, respectively, each of which comprises a device frame comprising a renewed pointer and said virtual container, said renewed pointer designating a location of the leading edge of said virtual container in said device frame, said device frames of said first and said second device frame signals being synchronized with each other; and a selecting unit connected to said first and said second pointer renewing units for selecting one of said first and said second device frame signals as a selected device frame signal;

said transmission line switching system including in said first pointer renewing unit:

a first buffer memory connected to said first transmission line;

a first interpreter connected to said first transmission line for interpreting the original pointer of said first transmission line signal as a first interpreted original pointer to produce a first interpreted signal representative of said first interpreted original pointer;

a first write controller connected to said first interpreter for controlling writing of the virtual container of said first transmission line signal in said first buffer memory in response to said first interpreted signal by supplying a first write address signal to said first buffer memory;

a first read controller for controlling reading of said virtual container out of said first buffer memory in response to a first controller stuff request signal by supplying a first read address signal to said first buffer memory;

a first comparing circuit for comparing said first read address signal with said first write address signal to produce a first primary stuff request signal;

a first buffer memory and said first interpreter for producing the renewed pointer of said first device frame signal in response to said first interpreted signal by monitoring said first buffer memory; and a first frame producer connected to said first buffer memory and said first renewed pointer producer for producing said first device frame signal;

said transmission line switching system including in said second pointer renewing unit;

a second buffer memory connected to said second transmission line;

a second interpreter connected to said second transmission line for interpreting the original pointer of said second transmission line signal as a second interpreted signal representative of said second interpreted original pointer;

a second write controller connected to said second interpreter for controlling writing of the virtual container of said second transmission line signal in said second buffer memory in response to said second interpreted signal by supplying a second write address signal to said second buffer memory;

a second read controller for controlling reading of said virtual container out of said second buffer memory in response to a second controller stuff request signal by supplying a second read address signal to said second buffer memory;

a second comparing circuit for comparing said second read address signal with said second write address signal to produce a second primary stuff request signal;

a second renewed pointer producer connected to said second buffer memory and said second interpreter for producing the renewed pointer of said second device frame signal in response to said second interpreted signal by monitoring said second buffer memory; and a second frame producer connected to said second buffer memory and said second renewed pointer producer for producing said second device frame signal;

said transmission line switching system comprising in said first pointer renewing unit;

a first pointer comparator connected to said first and said second renewed pointer producers for comparing the renewed pointer of said first device frame signal with the renewed pointer of said second device frame signal to produce a first subsidiary stuff request signal; and a first selector connected to said first pointer comparator for selecting one of said first primary stuff request signal and said first subsidiary stuff request signal as a first selected stuff request signal which is for use as said first controller stuff request signal;

said transmission line switching system comprising in said second pointer renewing unit;

a second pointer comparator connected to said first and said second renewed pointer producers for comparing the renewed pointer of said second device frame signal with the renewed pointer of said first device frame signal to produce a second subsidiary stuff request signal; and a second selector connected to said second pointer comparator for selecting one of said second primary stuff request signal and said second subsidiary stuff request signal as a second selected stuff request signal which is for use as said second controller stuff request signal.

2. A transmission line switching system as claimed in claim 1, wherein:

said first selector is connected to said selecting unit to select said first primary stuff request signal as said first selected stuff request signal when said selecting unit selects said first device frame signal as said selected device frame signal;

said second selector being connected to said selecting unit to select said second subsidiary stuff request signal as said second selected stuff request signal when said selecting unit selects said first device frame signal as said selected device frame signal.

3. A transmission line switching system as claimed in claim 1, wherein:

said first selector is connected to said selecting unit to select said first subsidiary stuff request signal as said first selected stuff request signal when said selecting unit selects said second device frame signal as said selected device frame signal;

said second selector being connected to said selecting unit to select said second primary stuff request signal as said second selected stuff request signal when said selecting unit selects said second device frame signal as said selected device frame signal.

* * * * *